(12) United States Patent
Taruya et al.

(10) Patent No.: US 6,668,238 B2
(45) Date of Patent: Dec. 23, 2003

(54) PRESSURE SENSOR

(75) Inventors: Masaaki Taruya, Tokyo (JP); Satoru Fukagawa, Tokyo (JP); Hiroshi Nakamura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/985,833

(22) Filed: Nov. 6, 2001

(65) Prior Publication Data

US 2002/0177971 A1 Nov. 28, 2002

(30) Foreign Application Priority Data

May 24, 2001 (JP) ......................... 2001-155508

(51) Int. Cl.[7] ..................... G01L 17/00; G06F 15/00
(52) U.S. Cl. ............................. 702/138; 702/98
(58) Field of Search .................. 702/85, 90, 98–99, 702/106–107, 116, 127, 138; 73/152.52, 708, 719–720, 726–727; 324/72, 72.5

(56) References Cited

U.S. PATENT DOCUMENTS 5,460,049 A * 10/1995 Kirsch ........................ 73/708
5,606,513 A * 2/1997 Louwagie et al. .......... 702/138
5,945,667 A * 8/1999 Bohnert et al. ......... 250/227.14
5,974,921 A * 11/1999 Ichikawa et al. ............. 83/13

FOREIGN PATENT DOCUMENTS

JP          9-218118         8/1999

* cited by examiner

Primary Examiner—Bryan Bui
(74) Attorney, Agent, or Firm—Sughrue Mion, PLLC

(57) ABSTRACT

A pressure sensor is provided which is tolerant to noise such as electromagnetic waves, is configured so as to be capable of easily selecting a system environment in which a sensor signal, commonly used for various kinds of systems, can be freely read in at timing as required by a system, and is able to realize reduction in size and cost suitable for automotive use. An element portion for detecting pressure and a circuit portion having a signal processing function are integrally accommodated in the same package. An interface section 24 optimized to interface with external wiring, an A/D conversion section 25 for digitally encoding an analog processed detection signal of the sensor, and a digital processing section 26 for converting the digitized signal into a desired serial signal are added to the circuit portion 2. The entire circuit portion is constituted by at most two ICs alone, and a selection can be made between two output forms including an analog processed detection signal and a digital processed detection signal.

11 Claims, 13 Drawing Sheets

PRESSURE SENSOR

This application is based on Application No. 2001-155508, filed in Japan on May 24, 2001, the contents of which are hereby incorporated by reference.

BACKGROUND OF THE INVENTION

1. Field of the Invention

The present invention relates to a pressure sensor, and in particular, to one suitable for automotive use or the like.

2. Description of the Related Art

FIG. 11 is a block diagram illustrating an example of the construction of a known semiconductor pressure sensor. An element portion 1 for detecting pressure is, for example, formed on a diaphragm D which is adapted to be deformed by an external force to be measured and acting thereon as shown in FIG. 12, and the element portion 1 is comprised of a bridge circuit including semiconductor gauge resistors RA-RD (a resistor RD is arranged at a side opposite a resistor RA) whose resistances change due to distortions thereof caused by the deformation of the diaphragm D. Note that a symbol R1 designates a temperature characteristic compensation resistor, and a symbol T designates a constant current circuit.

In FIG. 11, the known pressure sensor includes the element portion 1 for detecting the above-mentioned pressure, and a circuit portion 2 having a signal processing function. The circuit portion 2 includes a first integrated circuit (IC) 3 and a second integrated circuit (IC) 4 for storing bit data 22 to adjust and compensate for the initial variation and temperature dependency of a bridge circuit output 41 of the element portion 1. The second IC 4 includes an analog processing section 21 which operates to receive the bridge circuit output 41 of the element portion 1 and generates an analog output corresponding to the pressure applied to the diaphragm D, a characteristic adjustment and compensation section 23 for adjusting and compensating for the initial variation and temperature dependency of the bridge circuit output 41 of the element portion 1 based on the above-mentioned bit data 22, and an interface section 24 optimized to interface with external wiring.

Now, the operation of the known pressure sensor as illustrated in FIG. 11 will be described below in detail. When the diaphragm D (see FIG. 12) arranged at the element portion 1 receives an external force to be measured and is deformed thereby, the resistances of the semiconductor gauge resistors RA-RD, which are formed on the diaphragm D and whose resistances change in accordance with the distortion of the diaphragm D, change, thus resulting in a change in the output 41 of the bridge circuit comprised of the semiconductor gauge resistors RA-RD illustrated in FIG. 13. This change is amplified by the analog processing section 21 incorporated in the second IC 4 to provide a desired output SPAN.

The bridge circuit output 41 from the element portion 1 changing in accordance with the pressure applied to the diaphragm D usually varies depending upon individual elements. This is due to differences in the element detection sensitivities of the individual elements. At this time, in order to easily obtain the desired output SPAN for different element detection sensitivities varying in accordance with the individual elements, there is employed a technique or the like for controlling the amount of current supplied to the bridge circuit, as disclosed in Japanese Patent Application Laid-Open No. 9-218118 for instance.

According to this current amount controlling technique, the magnitude of the voltage to be supplied to resistors, which determine the amount of current flowing in the constant current circuit, is changed by giving the voltage in terms of bit data 22 stored in the first IC 3. The bit data is given via a communications channel 42 to the characteristic adjustment and compensation section 23, which is incorporated in the second IC 4 for adjusting and compensating for the initial variation and temperature dependency of the bridge circuit output 41 of the element portion 1.

With the above arrangement, it is possible to compensate for the element detection sensitivities, which change depending on the temperature for instance, by changing the bit data to be used depending on the temperature. The signal thus obtained according to the above operation is output as an analog signal 32 through the interface section 24 optimized to interface with external wiring.

The environments around motor vehicles in recent years have been greatly changed, and hence, system environments such as a surrounding environment of securing the tolerance to electromagnetic waves of very high frequencies, an environment in which sensor signals can be commonly used for various kinds of systems, in particular such a system environment in which sensor signals can be freely read in at timing as required by systems, have come to be demanded even in the field of motor vehicles.

A method of materializing this is a vehicle mounted LAN, and for instance there is a CAN or the like as such a method. This CAN method handles voltage information, which has usually been handled as an analog signal, by digitizing and converting it into a serial signal represented by bits. This has a merit in that there can be easily realized such a system environment in which the tolerance to noise such as electromagnetic waves can be greatly improved, and in which a sensor signal can be freely read in at timing as required by the above-mentioned system.

On the other hand, inexpensive sensors having a minimum function come to be demanded even more than before, and hence there is a problem with these contradictory demands in that the known pressure sensor configuration as illustrated in FIG. 11 is particularly difficult to adapt to the CAN method. In order to adapt the known sensor to the CAN system, it is at least necessary to add a CAN driver for interfacing with a bus line, a digital processing section for arithmetically processing and controlling a serial signal output in conformance with the CAN requirements, and an encoding section for digitally encoding an analog signal of the sensor. However, there arises another problem that the number of component members to be added for this purpose is not desirable or suitable for achieving miniaturization and cost reduction of the sensor for automotive use.

SUMMARY OF THE INVENTION

The present invention is intended to obviate the problems as referred to above, and has for its object to provide a pressure sensor which has greatly improved tolerance to noise such as electromagnetic waves, is configured such that a system environment is able to be easily selected in which a sensor signal can be freely read in at timing as required by the above-mentioned system, and is able to realize reduction in the size and cost thereof suitable for automotive use.

Bearing the above object in mind, according to one aspect of the present invention, there is provided a pressure sensor including an element portion for detecting pressure and a circuit portion having a signal processing function, both of which are integrally accommodated in the same package. The circuit portion comprises: a first section for performing analog processing of a detection signal from the element portion; a second section for storing bit data for characteristic adjustment and compensation and performing characteristic adjustment and compensation of the detection signal from the element portion based on the bit data; an interface section optimized to interface with external wiring; an A/D conversion section for digitally encoding the analog processed detection signal; and a digital processing section for converting the digitized signal into a desired serial signal.

Preferably, the pressure sensor includes an analog signal output and a digital signal output which are selectable between two output forms inclusive of an analog processed detection signal and a digital processed detection signal.

Preferably, the A/D conversion section and the digital processing section are incorporated in a first IC, whereas the interface section is incorporated in a second IC different from the first IC.

Preferably, the first IC comprises a section for storing the bit data, an A/D conversion section for digitally encoding the analog processed detection signal, and a digital processing section for converting the digitized signal into a desired serial signal, and the second IC comprises a section for performing analog processing of the detection signal from the element portion, a section for performing characteristic adjustment and compensation based on the bit data, and a serial interface section suitable for generating a serial output to the external wiring.

Preferably, the first IC comprises a section for storing the bit data, an A/D conversion section for digitally encoding the analog processed detection signal, a digital processing section for converting the digitized signal into a desired serial signal, a section for analog processing the detection signal from the element portion, and a section for performing characteristic adjustment and compensation based on the bit data, and the second IC comprises a serial interface section suitable for generating a serial output to the external wiring.

Preferably, the first IC comprises a section for performing analog processing of the detection signal from the element portion, a section for storing the bit data and performing characteristic adjustment and compensation based on the bit data, an A/D conversion section for digitally encoding the analog processed detection signal, and a digital processing section for converting the digitized signal into a desired serial signal, and the second IC comprises an interface section optimized to interface with the external wiring, and the first and second ICs are each provided with two output ports for the analog processed detection signal and the digital processed detection signal.

Preferably, the first IC comprises a section for performing analog processing of the detection signal from the element portion, a section for storing the bit data and performing characteristic adjustment and compensation based on the bit data, an A/D conversion section for digitally encoding the analog processed detection signal, and a digital processing section for converting the digitized signal into a desired serial signal, and the second IC comprises an interface section optimized to interface with the external wiring, and the first IC is provided with two output ports for the analog processed detection signal and the digital processed detection signal, and uses the output port for an analog signal, and the second IC is provided with the interface section for an analog signal suitable for an analog output.

Preferably, the first IC comprises a section for performing analog processing of the detection signal from the element portion, a section for storing the bit data and performing characteristic adjustment and compensation based on the bit data, an A/D conversion section for digitally encoding the analog processed detection signal, and a digital processing section for converting the digitized signal into a desired serial signal, and the second IC comprises an interface section optimized to interface with the external wiring, and the first IC is provided with an analog signal output port and a serial signal output port for the analog processed detection signal and the digital processed detection signal, respectively, and uses the serial signal output port, and the second IC is provided with the interface section for a serial signal suitable for a serial output.

Preferably, the pressure sensor further comprises a single conductor line connecting between the first and second ICs for communications of the analog processed detection signal or the digital processed detection signal therebetween.

Preferably, the pressure sensor further comprises a power supply input port for receiving electric power from an external power supply, and a power supply circuit for generating a voltage which has a ratio metric relation with respect to an input voltage supplied to the power supply input port and which has dropped from the input voltage from the external power supply, and the respective sections other than the power supply circuit and the interface section are configured to be operated by the dropped power supply circuit output.

Preferably, the first IC provided with the interface section comprises a power supply input port for receiving electric power from an external power supply, a power supply circuit for generating a voltage which has a ratio metric relation with respect to an input voltage supplied to the power supply input port and which has dropped from the input voltage from the external power supply, and a power supply output port for supplying the dropped power supply circuit output to the second IC, and the respective sections other than the power supply Circuit and the interface section are configured to be operated by the dropped power supply circuit output.

According to another aspect of the present invention, a pressure sensor has an element portion for sensing pressure and a circuit portion with a signal processing function integrally accommodated in the same package. Added to the circuit portion are an interface section optimized to interface with external wiring, an A/D conversion section for digitally encoding an analog processed detection signal of the sensor, and a digital processing section for converting the digitized signal into a desired serial signal. The entire circuit portion is constituted only by at most two ICs, and a selection can be made between two output forms including the analog processed detection signal and the digital processed detection signal.

With this arrangement, the tolerance to noise such as electromagnetic waves can be greatly improved, and at the same time, it can be configured such that a system environment is able to be easily selected in which a sensor signal can be freely read in at timing as required by the above-mentioned system. Additionally, it becomes possible to easily achieve the miniaturization and cost reduction of the sensor suitable for automotive use.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings.

Embodiment 1.

Figure 1:
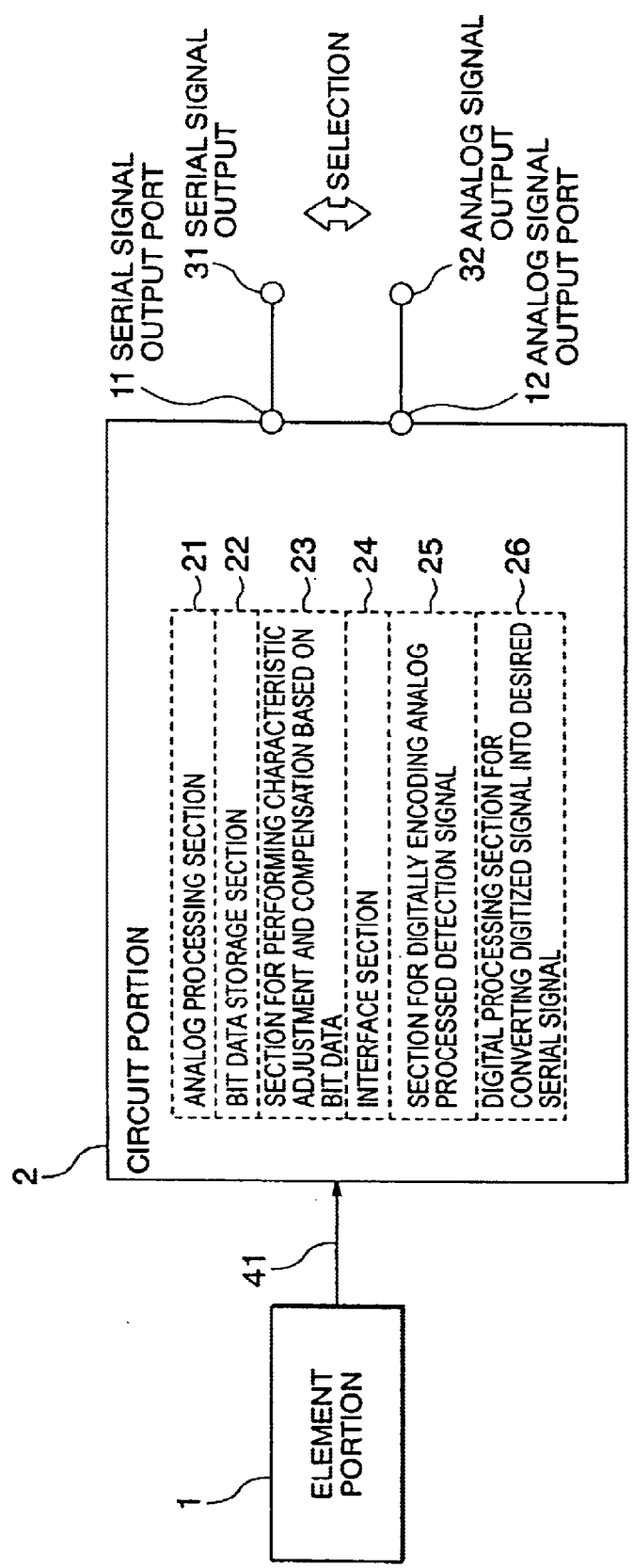
FIG. 1 is a block diagram illustrating the configuration of a pressure sensor according to a first embodiment of the present invention.
Figure 2:
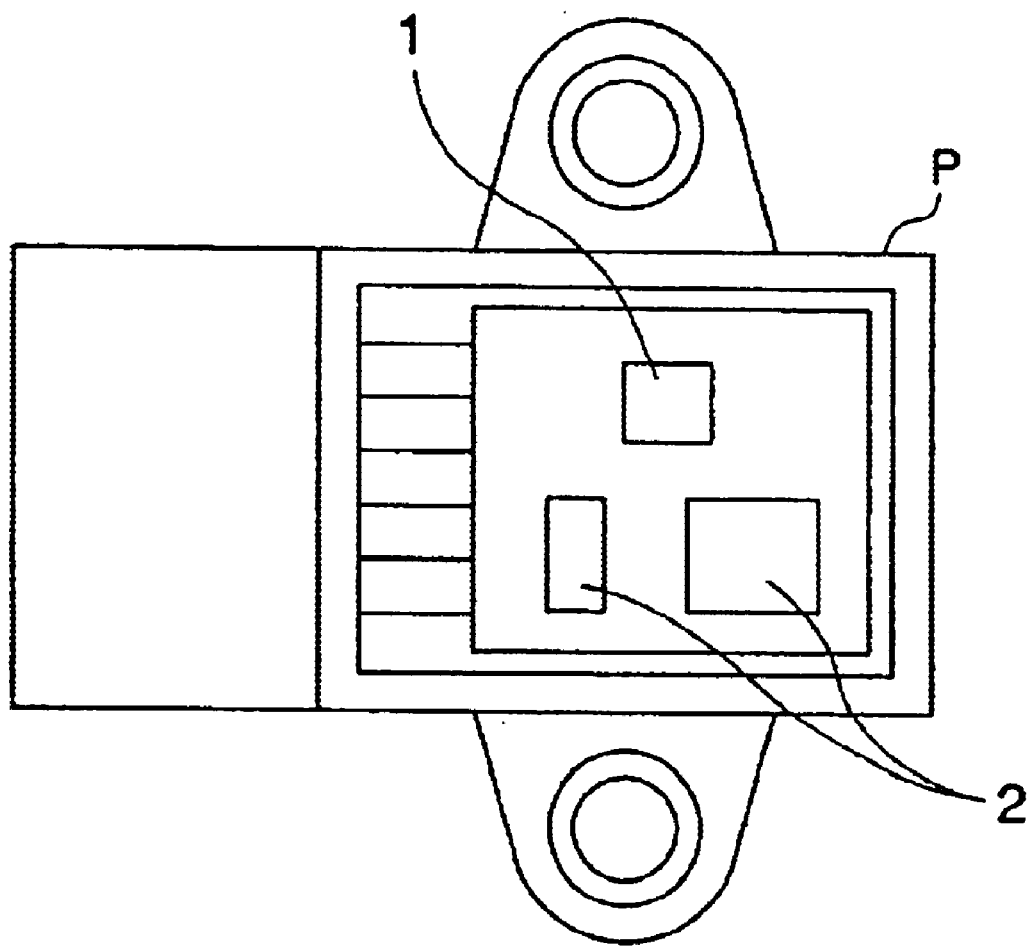
FIG. 2 is a view illustrating the entire configuration of the pressure sensor according to the first embodiment.
Figure 11:
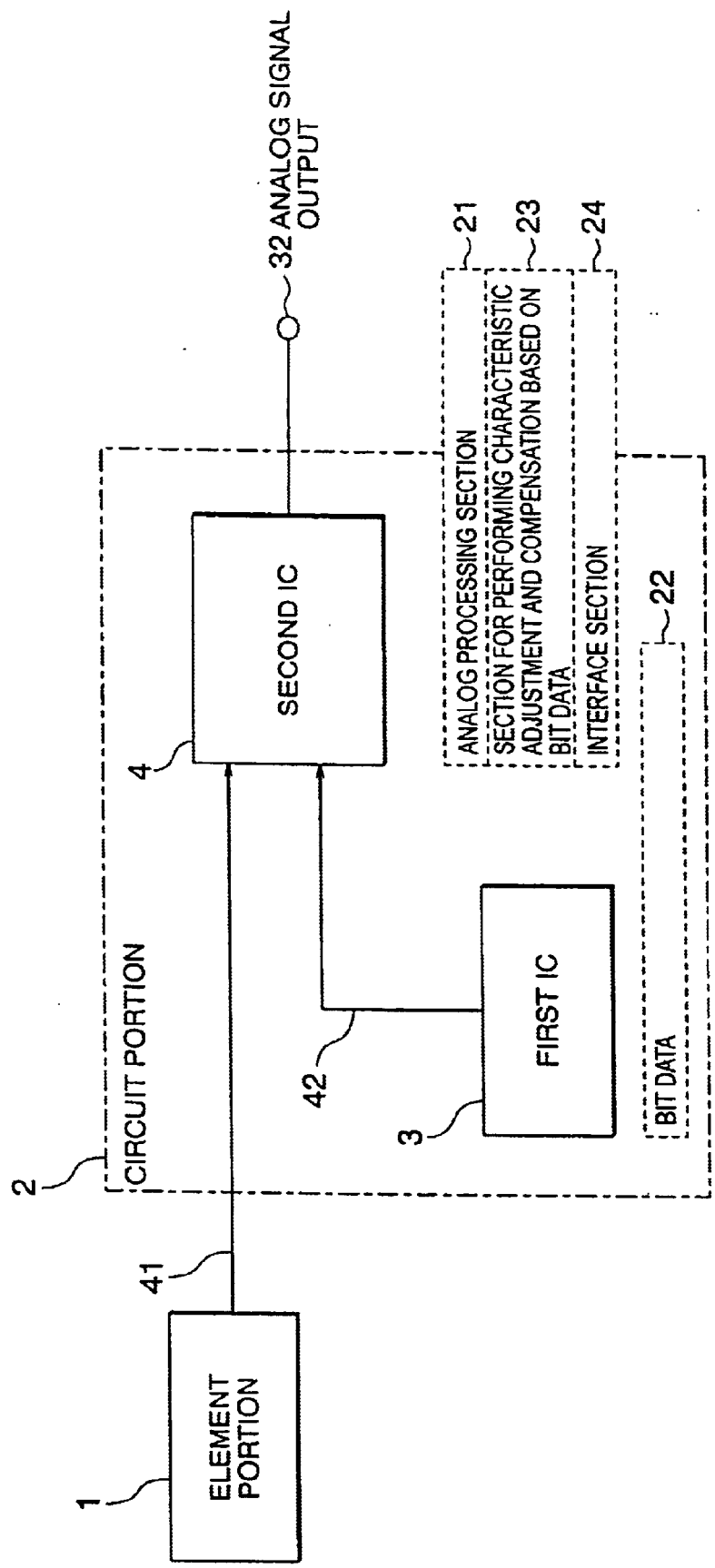
FIG. 11 is a block diagram illustrating the configuration of a known pressure sensor.
Figure 12:
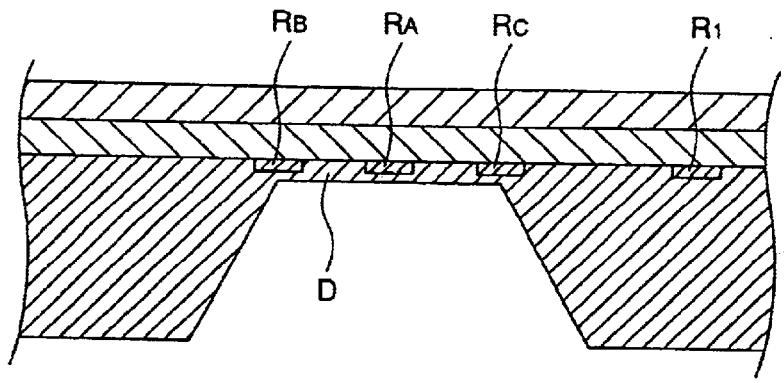
FIG. 12 is a cross sectional view illustrating the structure of a diaphragm of an element portion of the known pressure sensor shown in FIG. 11.
Figure 13:
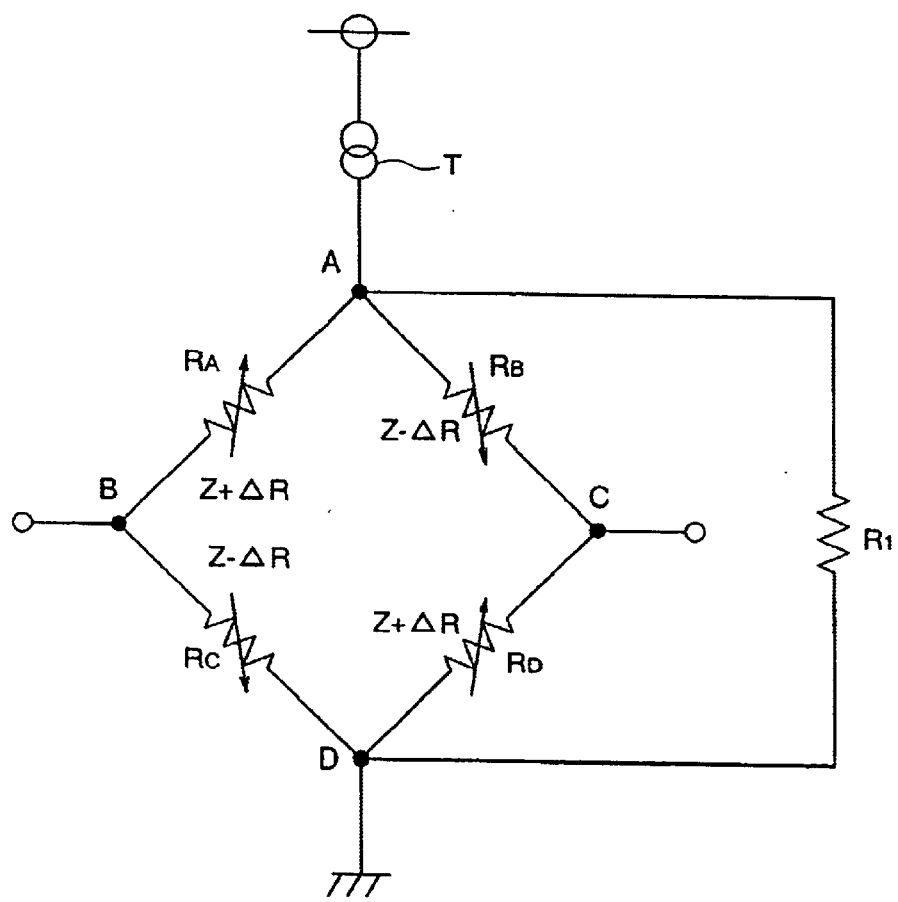
FIG. 13 is a view illustrating one example of a bridge circuit.

FIG. 1 is a block diagram illustrating the configuration of a pressure sensor according to a first embodiment of the present invention. The same or corresponding parts of this embodiment as those of the known sensor illustrated in FIG. 11 are designated by the same symbols while omitting a detailed description thereof. In this embodiment, the pressure sensor includes an element portion 1 for detecting pressure, and a circuit portion 2 having a signal processing function, both of which are integrally accommodated in a single or same package P as shown in FIG. 2.

The circuit portion 2, which may, in some case, be comprised of a plurality of integrated circuits (ICs), includes a section 21 for performing analog processing of a detection signal from the element portion 1, a section 22 for storing bit data, a section 23 for performing characteristic adjustment and compensation based on the bit data (though in the present invention, the sections 22, 23 in combination may, in some case, be called a section 23 for performing characteristic adjustment and compensation), an interface section 24 optimized to interface with external wiring, an analog to digital (A/D) conversion section 25 for digitally encoding the detection signal which has been analog processed, and a digital processing section 26 for converting the digitized signal into a desired serial signal. Moreover, the circuit portion 2 is provided with two output ports, i.e., a serial signal output port 11 and an analog signal output port 12, so that a selection can be made between two output forms of detection signals, i.e., an analog processed detection signal and a digital processed detection signal. Here, note that a reference numeral 31 designates a serial signal output, and a reference numeral 32 designates an analog signal output.

Thus, in this embodiment, added to or incorporated in the circuit portion 2 are the interface section 24 optimized to interface with external wiring, the A/D conversion section 25 for digitally encoding the detection signal of the sensor which has been subjected to analog processing, and the digital processing section 26 for converting the digitized signal into a desired serial signal, and at the same time, one of two output forms including an analog processed detection signal and a digital processed detection signal is made optionally selectable. With this arrangement, the tolerance to noise such as electromagnetic waves can be greatly improved, and it is constructed such that a system environment is able to be easily selected in which a sensor signal can be freely read in at the timing as required by the above-mentioned system. In addition, it also becomes possible to easily achieve miniaturization and reduction in cost of the pressure sensor suitable for automotive use.

Embodiment 2.

Figure 3:
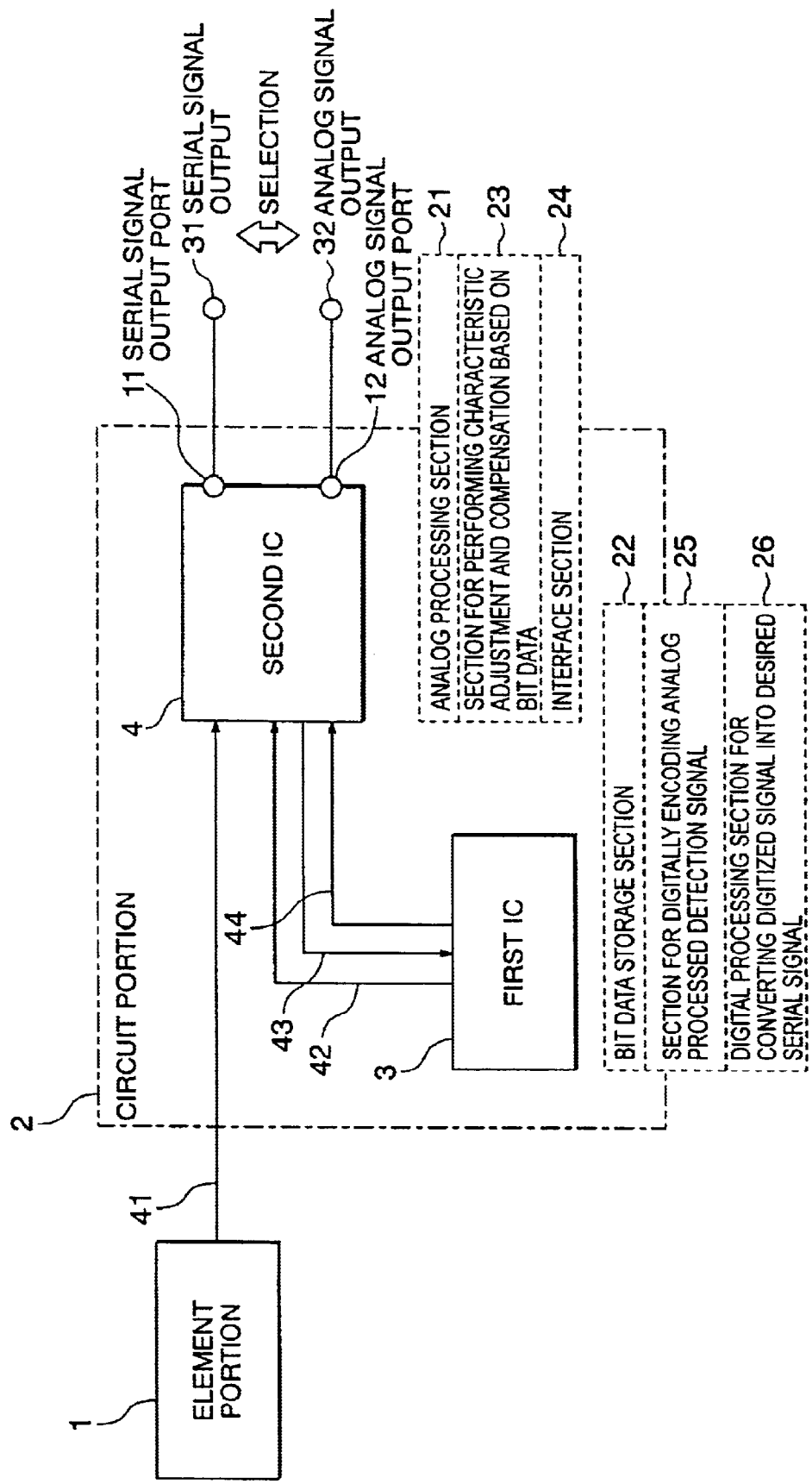
FIG. 3 is a block diagram illustrating the configuration of a pressure sensor according to a second embodiment of the present invention.

FIG. 3 is a block diagram illustrating the configuration of a pressure sensor according to a second embodiment of the present invention. The same or corresponding parts of this embodiment as those of the above-mentioned first embodiment are identified by the same symbols, and a detailed description thereof is omitted. In this embodiment, a first IC 3 includes a section 22 for storing bit data, an A/D conversion section 25 for digitally encoding an analog processed detection signal, and a digital processing section 26 for converting the digitized signal into a desired serial signal, whereas a second IC 4 includes a section 21 for performing analog processing of a detection signal from an element portion 1, a section 23 for performing characteristic adjustment and compensation based on the bit data, and an interface section 24 optimized to interface with external wiring.

In addition, the second IC 4 is provided with two output ports including a serial signal output port 11 and an analog signal output port 12, so that a selection can be made between two output forms including an analog processed detection signal and a digital processed detection signal. Moreover, connected between the two ICs 3 and 4 are three conductor lines or wires including a bit data communication line 42 for communications of bit data, an analog processed detection signal communication line 43 for communications of an analog processed detection signal, and a digital processed detection signal communication line 44 for communications of a digital processed detection signal.

In this embodiment, the sections are distributed to manufacturing processes, respectively, in which the function of each section can be easily achieved, so that they are constituted by two ICs. This makes it possible to easily achieve further cost reduction suitable for automotive use.

Embodiment 3.

Figure 4:
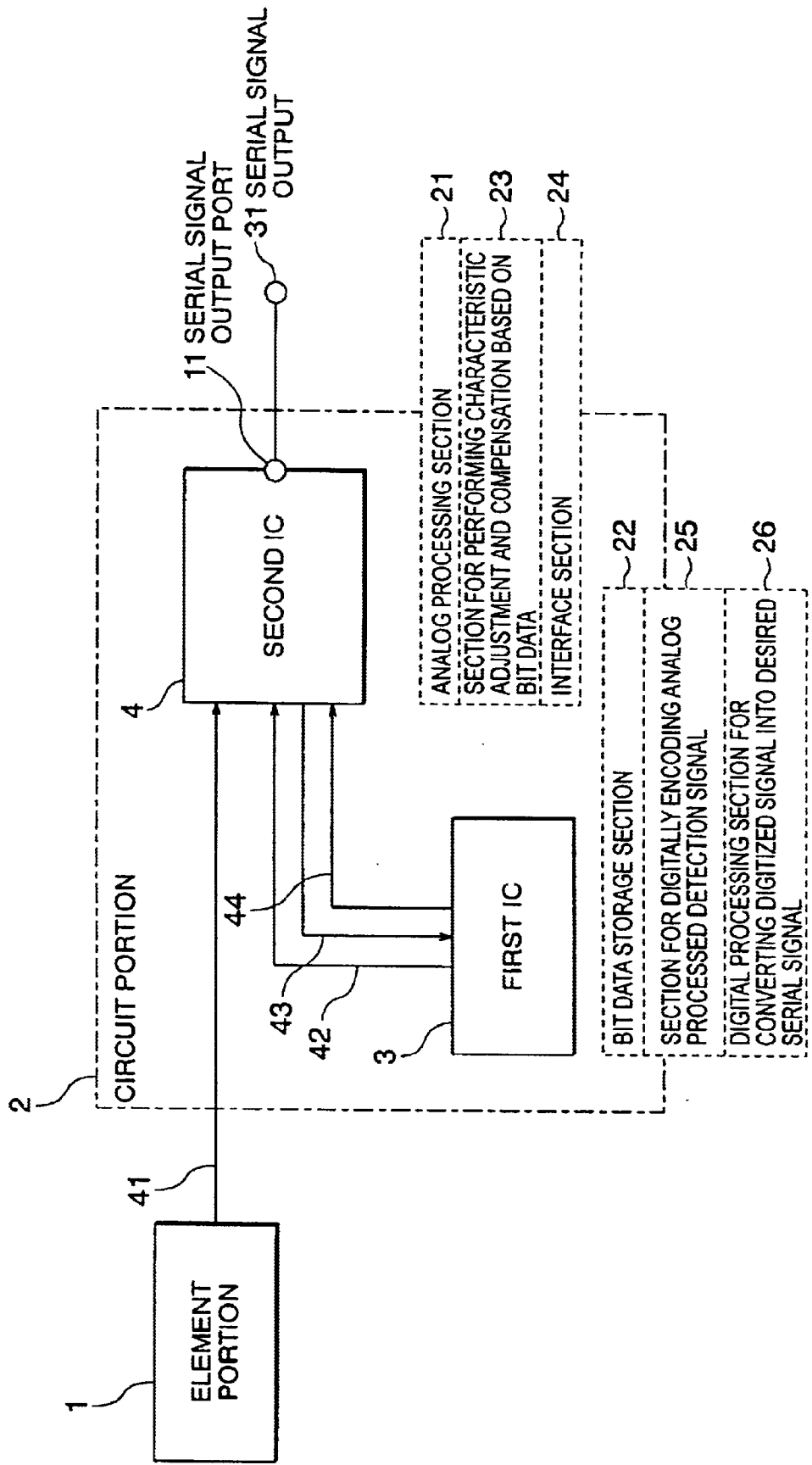
FIG. 4 is a block diagram illustrating the configuration of a pressure sensor according to a third embodiment of the present invention.

FIG. 4 is a block diagram illustrating the configuration of a pressure sensor according to a third embodiment of the present invention. The same or corresponding parts of this embodiment as those of the above-mentioned embodiments are identified by the same symbols while omitting a detailed description thereof. This embodiment is different from the second embodiment of FIG. 3 in that the second IC 4 is provided with the serial signal output port 11 alone while omitting the analog port 12. This arrangement serves to easily achieve yet further cost reduction suitable for automotive use.

Embodiment 4.

Figure 5:
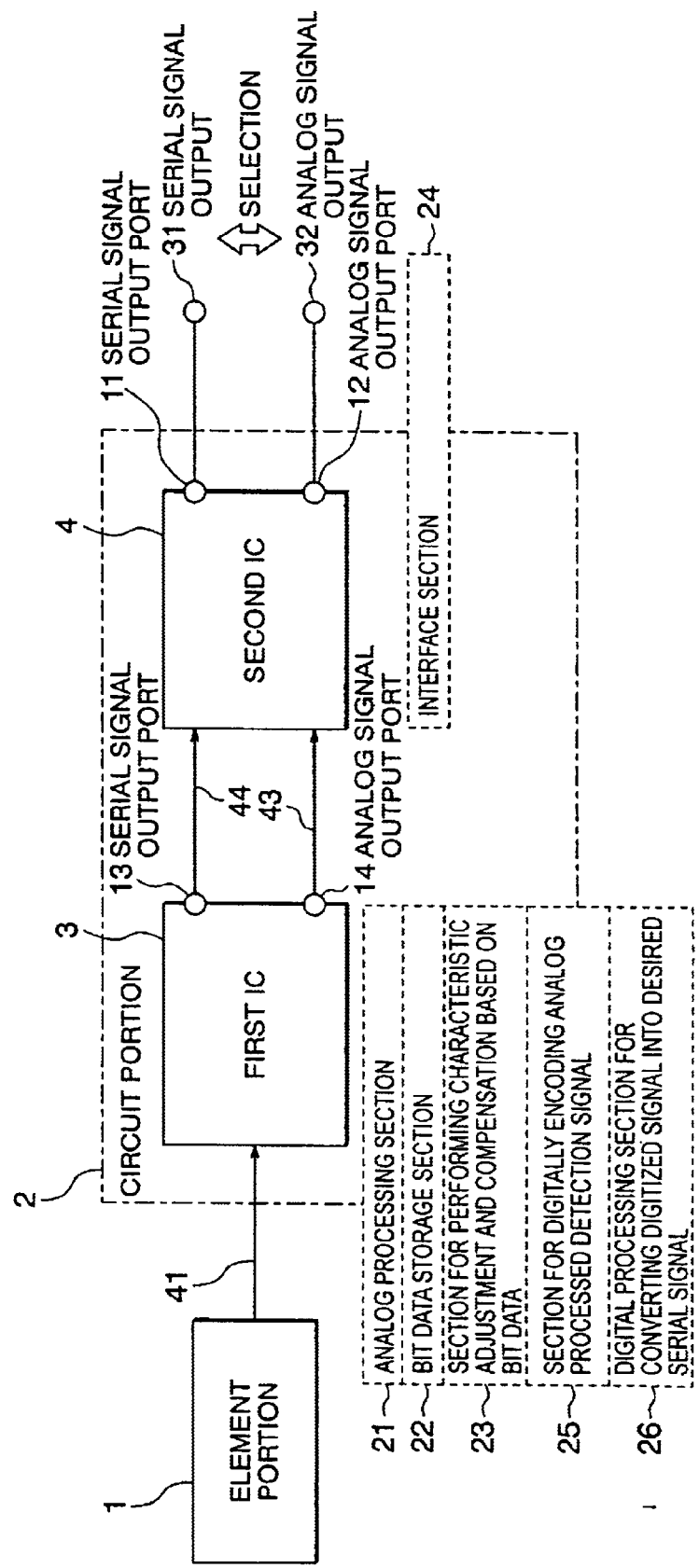
FIG. 5 is a block diagram illustrating the configuration of a pressure sensor according to a fourth embodiment of the present invention.

FIG. 5 is a block diagram illustrating the configuration of a pressure sensor according to a fourth embodiment of the present invention. The same or corresponding parts of this embodiment as those of the above-mentioned embodiments are identified by the same symbols while omitting a detailed description thereof. In this embodiment, a first IC 3 includes a section 21 for performing analog processing of a detection signal from the element portion 1, a section 22 for storing bit data, a section 23 for performing characteristic adjustment and compensation based on the bit data, an A/D conversion section 25 for digitally encoding an analog processed detection signal, and a digital processing section 26 for converting the digitized signal into a desired serial signal, whereas A second IC 4 includes an interface section 24 optimized to interface with external wiring, and two output ports including a serial signal output port 11 and an analog signal output port 12 for enabling one of two output forms inclusive of an analog processed detection signal and a digital processed detection signal to be selected. Moreover, the first IC 3 is also provided with a total of two output ports including a serial signal output port 13 and an analog signal output port 14. In addition, connected between the two ICs 3 and 4 are a single first conductor line 43 for communications of the analog processed detection signal and a single second conductor line 44 for communications of the digital processed detection signal.

In this embodiment, the sections are distributed to manufacturing processes, respectively, in which the function of each section can be easily achieved, so that they are constituted by two ICs. At the same time, the functions are distributed to the two ICs in such a manner that wiring required for communications between the ICs is minimized, thus making it possible to easily achieve further cost reduction suitable for automotive use.

Embodiment 5.

Figure 6:
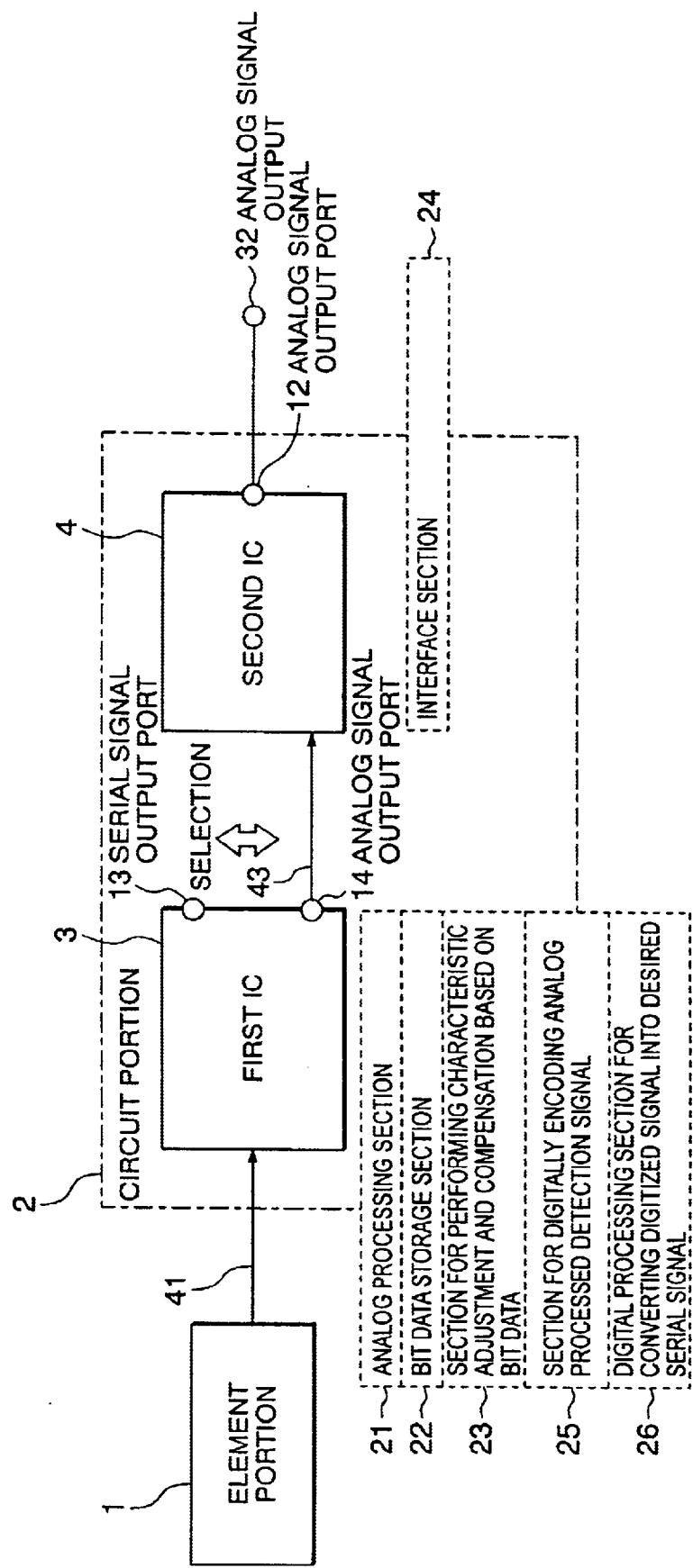
FIG. 6 is a block diagram illustrating the configuration of a pressure sensor according to a fifth embodiment of the present invention.

FIG. 6 is a block diagram illustrating the configuration of a pressure sensor according to a fifth embodiment of the present invention. The same or corresponding parts of this embodiment as those of the above-mentioned embodiments are identified by the same symbols while omitting a detailed description thereof. This embodiment is different form the fourth embodiment shown in FIG. 5 in that the second IC 4 is provided with the analog signal output port 12 alone while omitting the serial signal output port 11. This arrangement serves to easily achieve further cost reduction suitable for automotive use.

Embodiment 6.

Figure 7:
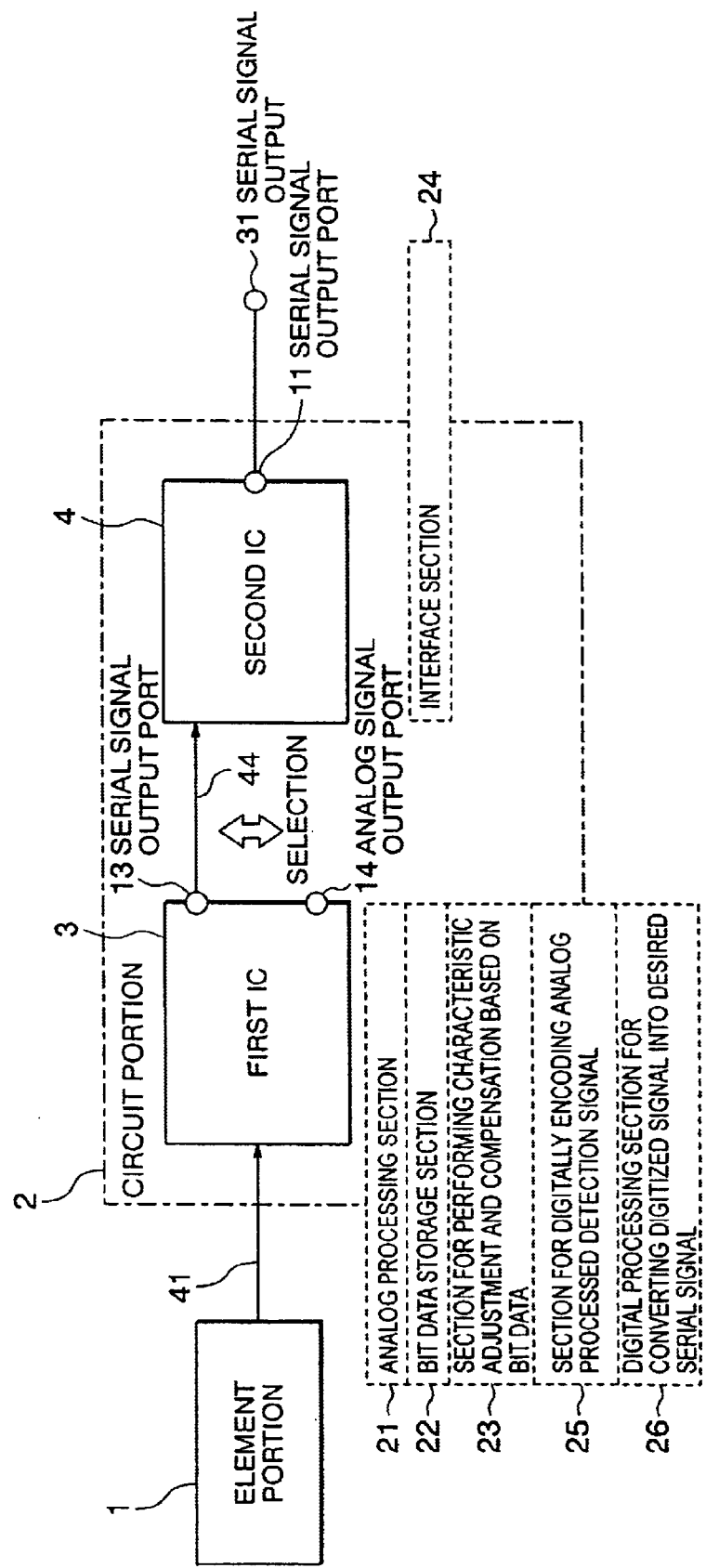
FIG. 7 is a block diagram illustrating the configuration of a pressure sensor according to a sixth embodiment of the present invention.

FIG. 7 is a block diagram illustrating the configuration of a pressure sensor according to sixth embodiment of the present invention. The same or corresponding parts of this embodiment as those of the above-mentioned embodiments are identified by the same symbols while omitting a detailed description thereof. This embodiment is different from the fourth embodiment shown in FIG. 5 in that the second IC 4 is provided with the serial signal output port 11 alone while omitting the analog signal output port 12. With this arrangement, it is possible to easily achieve further cost reduction suitable for automotive use.

Embodiment 7.

Figure 8:
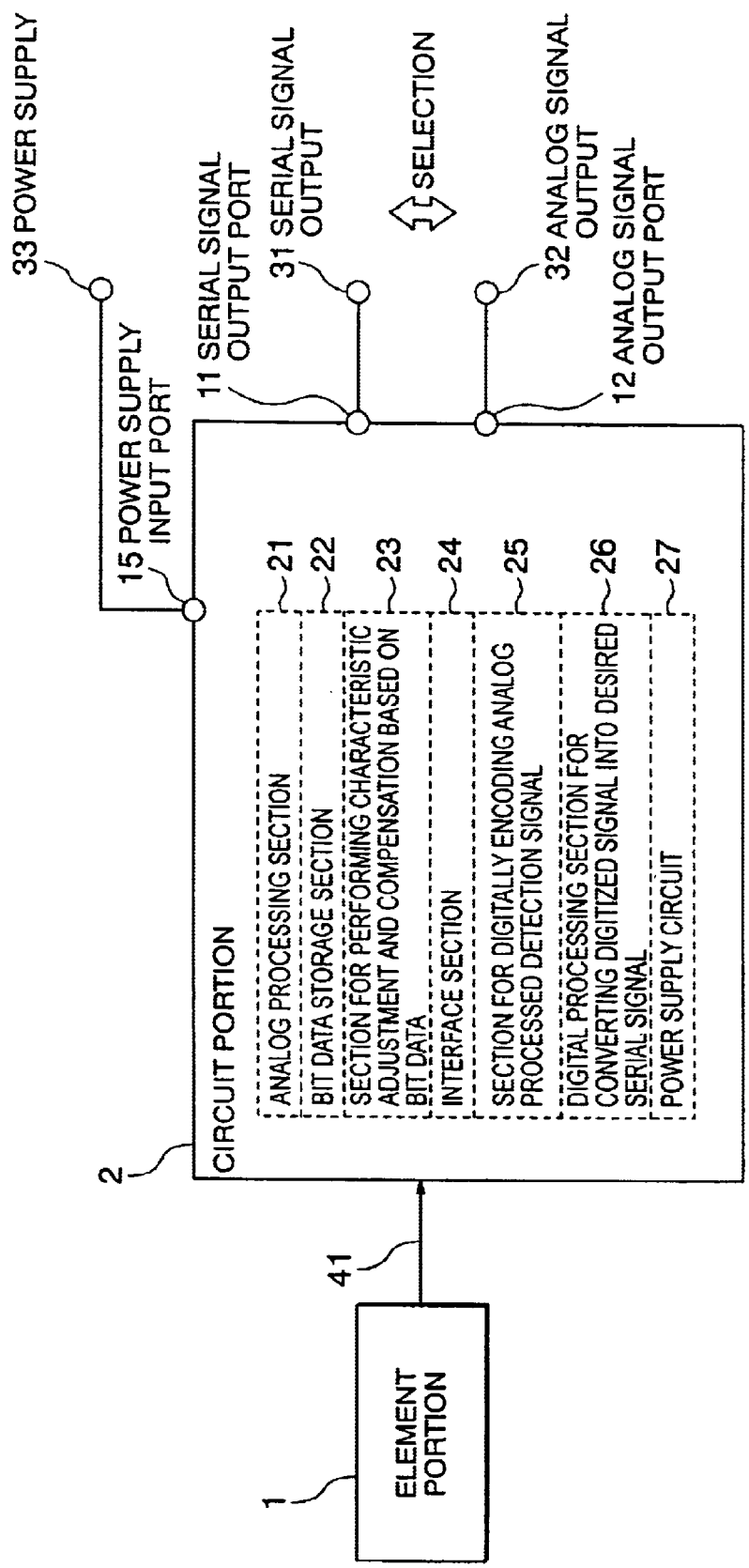
FIG. 8 is a block diagram illustrating the configuration of a pressure sensor according to a seventh embodiment of the present invention.

FIG. 8 is a block diagram illustrating the configuration of a pressure sensor according to a seventh embodiment of the present invention. The same or corresponding parts of this embodiment as those of the above-mentioned embodiments are identified by the same symbols while omitting a detailed description thereof. This embodiment includes, in addition to the components of the first embodiment shown in FIG. 1, a power supply input port 15 for supplying electric power from an external power supply 33 to the circuit portion 2, and a power supply circuit 27 for generating a voltage, which has a ratio metric relation with respect to a voltage input to the power supply input port 15 and which is dropped from or lower than the input voltage thereto, so that the respective sections 21 through 26 other than the power supply circuit 27 are driven to operate by the output of the power supply circuit 27 which has dropped from the input voltage as referred to above.

In this embodiment, it is constructed such that the power supply circuit 27 generates a voltage which has a ratio metric relation with a voltage input to the power supply input port 15 and which has dropped from the power supply voltage input thereto. With this arrangement, it is possible to minimize the current consumption required of the entire circuit portion 2, thus easily realizing further reduction in cost suitable for automotive use.

Embodiment 8.

Figure 9:
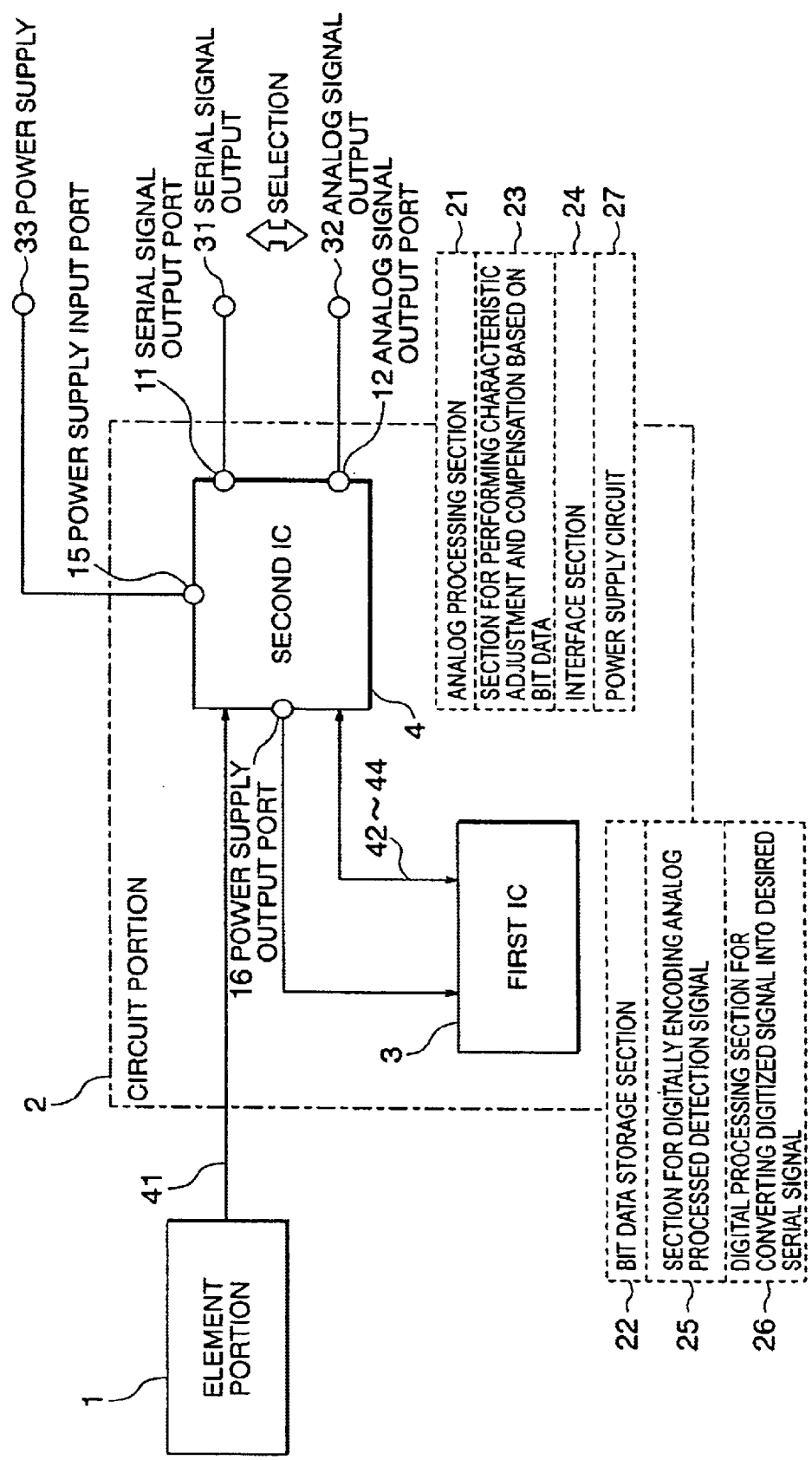
FIG. 9 is a block diagram illustrating the configuration of a pressure sensor according to an eighth embodiment of the present invention.

FIG. 9 is a block diagram illustrating the configuration of a pressure sensor according to an eighth embodiment of the present invention. The same or corresponding parts of this embodiment as those of the above-mentioned embodiments are identified by the same symbols while omitting a detailed description thereof. This embodiment includes, in addition to the components of the second embodiment illustrated in FIG. 3, a power supply input port 15 for supplying electric power from an external power supply 33 to the second IC 4, a power supply circuit 27 for generating a voltage which has a ratio metric relation with respect to a voltage input to the power supply input port 15 and which has dropped from the power supply voltage input thereto, and a power supply output port 16 particularly for sections 22, 25 and 26 for driving respective sections 21–23, 25 and 26 other than the power supply circuit 27 and an interface section 24 to operate by the output of the power supply circuit 27.

In this embodiment, in the case of the circuit portion 2 being constituted by two ICs, it is constructed such that a voltage having a ratio metric relation with respect to an input voltage supplied to the power supply input port 15 of one of the two ICs and having dropped from the input voltage is output to the other IC from the power supply output port 16, thereby reducing the current consumption required of the entire circuit portion to a minimum. As a result, it is possible to easily achieve further cost reduction suitable for automotive use.

Embodiment 9.

Figure 10:
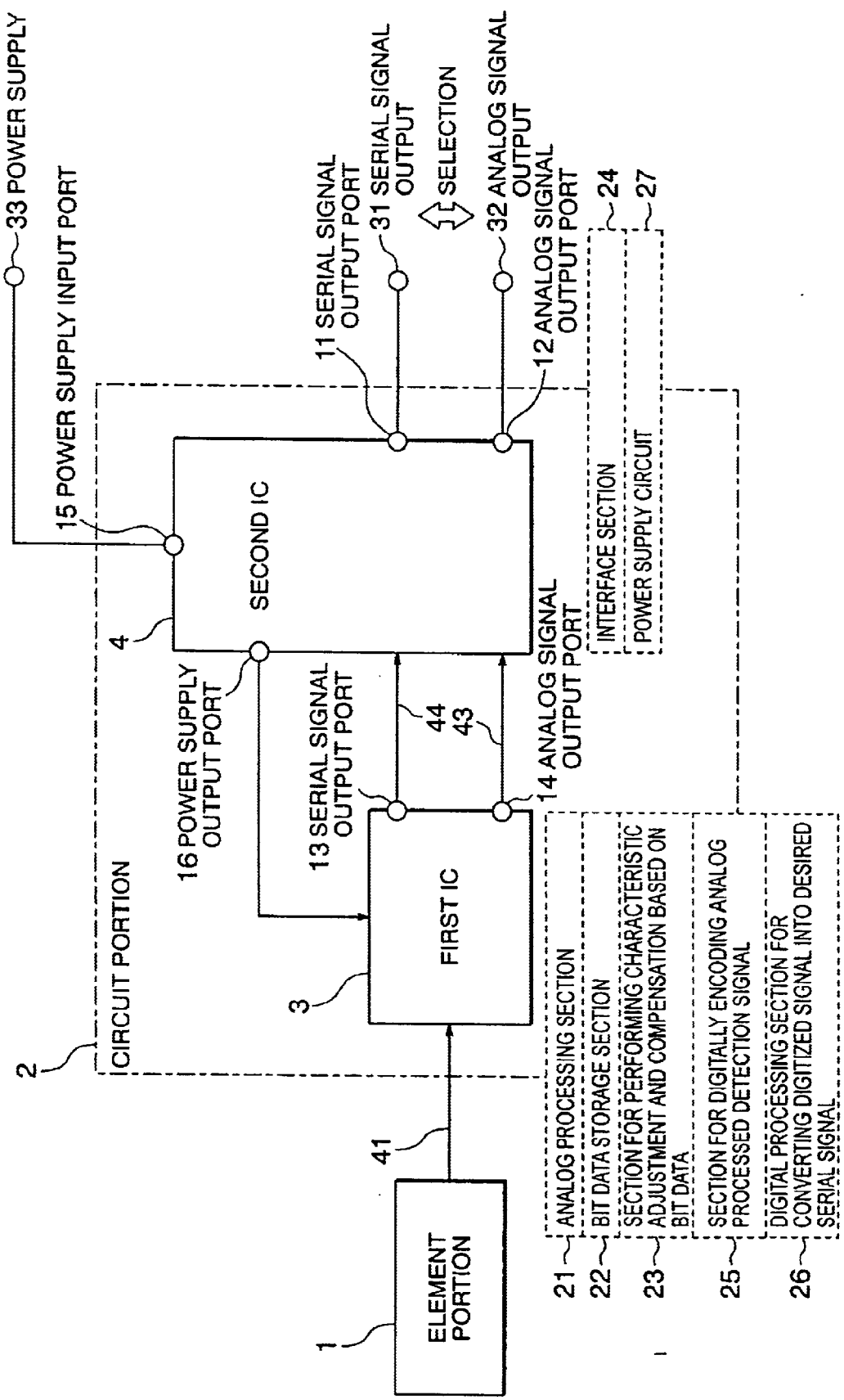
FIG. 10 is a block diagram illustrating the configuration of a pressure sensor according to a ninth embodiment of the present invention.

FIG. 10 is a block diagram illustrating the configuration of a pressure sensor according to a ninth embodiment of the present invention. The same or corresponding parts of this embodiment as those of the above-mentioned embodiments are identified by the same symbols while omitting a detailed description thereof. This embodiment includes, in addition to the components of the fourth embodiment illustrated in FIG. 5, a power supply input port 15 for inputting electric power from an external power supply 33 to the second IC 4, a power supply circuit 27 for generating a voltage which has a ratio metric relation with respect to an input voltage supplied to the power supply input port 15 and which has dropped from the power supply input thereto, and a power supply output port 16, particularly for sections 21–23, 25 and 26, for driving respective sections 21–23, 25 and 26 other than the power supply circuit 27 and an interface section 24 to operate by the dropped output of the power supply circuit 27.

This embodiment is constructed such that in the case of the circuit portion being constituted by two ICs, a voltage having a ratio metric relation with respect to an input voltage supplied to the power supply input port 15 of one of the ICs and having dropped from the power supply input thereto is output to the other IC from the power supply output port 16, thereby minimizing the current consumption required of the entire circuit portion. Thus, it is possible to easily achieve further cost reduction suitable for automotive use.

EXAMPLE

Figure 14:
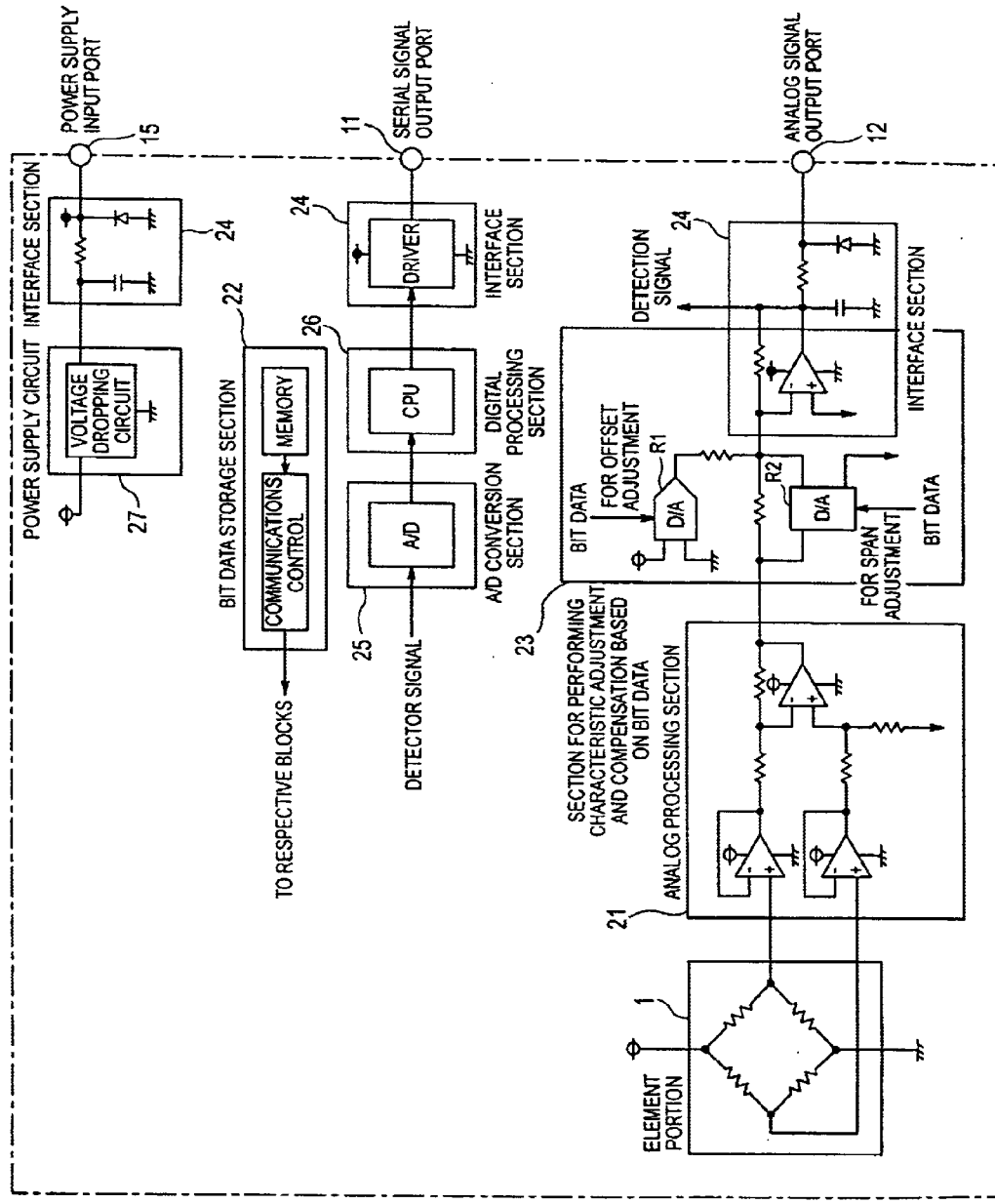
FIG. 14 is a view illustrating a concrete example of a hardware configuration implementing a pressure sensor of the present invention.

FIG. 14 illustrates one concrete example of a hardware configuration which implements a pressure sensor of the present invention. An analog processing section 21 is constituted by a differential amplifier for amplifying, by a predetermined gain, a voltage difference between respective nodes, which is generated by a change in resistance of respective semiconductor gauge resistors of an element portion 1 which is configured into a bridge circuit.

A section 23 for performing characteristic adjustment and compensation based on bit data includes two kinds of bit resistors, i.e., a first bit resistor R1 and a second bit resistor R2, which are configured in such a manner that the gain and offset adjustment of the output of the analog processing section 21 can be carried out by changing the bit resistances of the bit resistors R1 and R2.

The first bit resistor R1 in the form of a D/A converter is configured such that a specific resistance thereof is changed in accordance with bit data supplied thereto. Specifically, the first bit resistor R1 generates an output voltage corresponding to a resistance divided voltage of a potential between the power supply input thereto and ground, and it has an output terminal connected with an inverted input terminal of an output operational amplifier through a resistor. Thus, there develops a potential difference across the resistor corresponding to a difference between the voltage of the output terminal of the first bit resistor R1 and a voltage of a non-inverting input terminal of the output operational amplifier, so that a current is accordingly generated. As a consequence, the output operational amplifier generates a current flowing into a feedback resistor connected between the output terminal and the inverted input terminal of the output operational amplifier, thus resulting in an offset in the output of the operational amplifier. That is, by changing the resistance divided potential of the first bit resistor R1 based on the bit data, it is possible to change the output offset of the operational amplifier ("OFFSET" adjustment in FIG. 14). For instance, if the bit data to be used is changed depending on the temperature, the temperature compensation of the output offset can be easily carried out.

Also, the second bit resistor R2 in the form of a D/A converter is configured in such a manner that the resistance thereof is changed by bit data supplied thereto. To this end, the second bit resistor R2 has one terminal connected with the output of the analog processing section 21 and the other terminal connected with the inverted input terminal of the output operational amplifier with a resistor connected across the second bit resistor R2, so that the gain determined by a ratio of the resistance of the second bit resistor R2 to the resistance of the feedback resistor of the output operational amplifier is varied by changing the bit data supplied to the second bit resistor R2. That is, by changing the resistance of the second bit resistor R2 based on the bit data supplied thereto, it is possible to change the output gain of the operational amplifier ("SPAN" adjustment in FIG. 14). For instance, if the bit data to be used is changed depending on the temperature, the temperature compensation of the output gain can be easily performed.

Interface sections 24 are each configured in such a manner that the desired performance can be obtained for a load connected with a corresponding port for instance, or they are configured in consideration of their adaptability to noise to be superposed on a connection harness, the protection against serge, etc. A driver "DRIVER" connected with a serial signal output port 11 serves to amplify a signal "0" or "1" output in time series from a CPU of a digital processing section 26, and generate an output in the form of a voltage or current turn-on or turn-off signal.

A bit data storage section 22 is used in a section 23 which performs characteristic adjustment and compensation based on the above-mentioned bit data. The bit data storage section 22 is configured in such a manner that bit data for obtaining the desired performance is stored in a memory at the time of characteristic adjustment, and it is constituted by the memory and a communications control circuit for example.

An A/D conversion section 25 is constituted by an A/D converter which converts an analog output signal of the sensor into bit data which is divided into a plurality of bit sets each consisting of a predetermined number of bits.

A digital processing section 26 serves to convert the A/D converted output of the A/D conversion section 25 into a serial signal conforming to a prescribed communications specification (e.g., transmission rate, communications cycle, data format, etc.), and it is constituted by a CPU.

A power supply circuit 27 is constituted by a voltage dropping circuit for instance, which serves to output a reference voltage, determined by the resistance divided potential of the power supply, with a voltage follower.

As can be seen from the foregoing, the present invention provides the following advantages.

According to the present invention, a pressure sensor includes an element portion for detecting pressure and a circuit portion having a signal processing function, both of which are integrally accommodated in the same package. The circuit portion comprises: a first section for performing analog processing of a detection signal from the element portion; a second section for storing bit data for characteristic adjustment and compensation and performing characteristic adjustment and compensation of the detection signal from the element portion based on the bit data; an interface section optimized to interface with external wiring; an A/D conversion section for digitally encoding the analog processed detection signal; and a digital processing section for converting the digitized signal into a desired serial signal. With this arrangement, the tolerance to noise such as electromagnetic waves can be greatly improved. Moreover, it can be configured such that under environments where a sensor signal is commonly used for a variety of systems, a system environment is able to be easily selected in which a sensor signal can be freely read in at timing as required by the systems. In addition, it becomes possible to easily achieve the miniaturization and cost reduction of the sensor suitable for automotive use.

In a preferred form of the present invention, the pressure sensor includes an analog signal output and a digital signal output which are selectable between two output forms inclusive of an analog processed detection signal and a digital processed detection signal. Thus, a selection can be made between two output forms, and hence the tolerance to noise such as electromagnetic waves can be greatly improved. Additionally, the pressure sensor can be configured such that it is possible to easily select a system environment in which a sensor signal, commonly used for various kinds of systems, can be freely read in at timing as required by a system.

In another preferred form of the present invention, the A/D conversion section and the digital processing section are incorporated in a first IC, whereas the interface section is incorporated in a second IC different from the first IC. With this arrangement, the functions of the respective sections are distributed to manufacturing processes, respectively, in which the function of each section can be easily achieved. so that they can be constituted by two ICs. This serves to achieve further cost reduction suitable for automotive use.

In a further preferred form of the present invention, the first IC comprises a section for storing the bit data, an A/D conversion section for digitally encoding the analog processed detection signal, and a digital processing section for converting the digitized signal into a desired serial signal, and the second IC comprises a section for performing analog processing of the detection signal from the element portion, a section for performing characteristic adjustment and compensation based on the bit data, and a serial interface section suitable for generating a serial output to the external wiring. With this arrangement, the functions of the sections are distributed to manufacturing processes, respectively, in which the function of each section can be easily achieved, so that they can be constituted by two ICs, thus making it possible to achieve further cost reduction suitable for automotive use.

In a yet further preferred form of the present invention, the first IC comprises a section for storing the bit data, an A/D conversion section for digitally encoding the analog processed detection signal, a digital processing section for converting the digitized signal into a desired serial signal, a section for analog processing the detection signal from the element portion, and a section for performing characteristic adjustment and compensation based on the bit data, and the second IC comprises a serial interface section suitable for generating a serial output to the external wiring. Thus, the functions of the sections are distributed to manufacturing processes, respectively, in which the function of each section can be easily achieved, so that they are constituted by two ICs. At the same time, the functions are distributed to the two ICs in such a manner that wiring required for communications between the ICs is minimized, thus making it possible to easily achieve further cost reduction suitable for automotive use.

In a still further preferred form of the present invention, the first IC comprises a section for performing analog processing of the detection signal from the element portion, a section for storing the bit data and performing characteristic adjustment and compensation based on the bit data, an AID conversion section for digitally encoding the analog processed detection signal, and a digital processing section for converting the digitized signal into a desired serial signal, and the second IC comprises an interface section optimized to interface with the external wiring, and the first and second ICs are each provided with two output ports for the analog processed detection signal and the digital processed detection signal. Thus, the functions of the sections are distributed to manufacturing processes, respectively, in which the function of each section can be easily achieved, so that they are constituted by two ICs. Also, the functions are distributed to the two ICs in such a manner that wiring required for communications between the ICs is minimized. This serves to easily achieve further cost reduction suitable for automotive use.

In a further preferred form of the present invention, the first IC comprises a section for performing analog processing of the detection signal from the element portion, a section for storing the bit data and performing characteristic adjustment and compensation based on the bit data, an A/D conversion section for digitally encoding the analog processed detection signal, and a digital processing section for converting the digitized signal into a desired serial signal, and the second IC comprises an interface section optimized to interface with the external wiring, and the first IC is provided with two output ports for the analog processed detection signal and the digital processed detection signal, and uses the output port for an analog signal, and the second IC is provided with the interface section for an analog signal suitable for an analog output. With this arrangement, the functions of the sections are distributed to manufacturing processes, respectively, in which the function of each section can be easily achieved, so they are constituted by two ICs. At the same time, the functions are distributed to the two ICs in such a manner that wiring required for communications between the ICs is minimized, thus making it possible to easily achieve further cost reduction suitable for automotive use.

In a further preferred form of the present invention, the first IC comprises a section for performing analog processing of the detection signal from the element portion, a section for storing the bit data and performing characteristic adjustment and compensation based on the bit data, an A/D conversion section for digitally encoding the analog processed detection signal, and a digital processing section for converting the digitized signal into a desired serial signal, and the second IC comprises an interface section optimized to interface with the external wiring, and the first IC is provided with two output ports for the analog processed detection signal and the digital processed detection signal, and uses the output port for an analog signal, and the second IC is provided with the interface section for an analog signal suitable for an analog output. With this arrangement, the functions of the sections are distributed to manufacturing processes, respectively, in which the function of each section can be easily achieved, so they are constituted by two ICs. At the same time, the functions are distributed to the two ICs in such a manner that wiring required for communications between the ICs is minimized, thus making it possible to easily achieve further cost reduction suitable for automotive use.

In a further preferred form of the present invention, the pressure sensor further comprises a single conductor line connecting between the first and second ICs for communications of the analog processed detection signal or the digital processed detection signal therebetween. Thus, wiring required for communications between the ICs is reduced to a minimum, thereby making it possible to easily achieve further cost reduction suitable for automotive use.

In a further preferred form of the present invention, the pressure sensor further comprises a power supply input port for receiving electric power from an external power supply, and a power supply circuit for generating a voltage which has a ratio metric relation with respect to an input voltage supplied to the power supply input port and which has dropped from the input voltage from the external power supply, and the respective sections other than the power supply circuit and the interface section are configured to be operated by the dropped power supply circuit output. With this arrangement, the current consumption required of the entire circuit portion is reduced to a minimum, so that it becomes possible to easily achieve further cost reduction suitable for automotive use.

In a further preferred form of the present invention, the first IC provided with the interface section comprises a power supply input port for receiving electric power from an external power supply, a power supply circuit for generating a voltage which has a ratio metric relation with respect to an input voltage supplied to the power supply input port and which has dropped from the input voltage from the external power supply, and a power supply output port for supplying the dropped power supply circuit output to the second IC, and the respective sections other than the power supply circuit and the interface section are configured to be operated by the dropped power supply circuit output. Thus, the current consumption required of the entire circuit portion is reduced to a minimum, thereby making it possible to easily achieve further cost reduction suitable for automotive use.

While the invention has been described in terms of preferred embodiments, those skilled in the art will recognize that the invention can be practiced with modifications within the spirit and scope of the appended claims.

What is claimed is:

1. A pressure sensor including an element portion for detecting pressure and a circuit portion having a signal processing function, both of which are integrally accommodated in the same package,
said circuit portion comprising:
a first section for performing analog processing of a detection signal from said element portion;
a second section for storing bit data for characteristic adjustment and compensation and performing characteristic adjustment and compensation of the detection signal from said element portion based on said bit data;
an interface section optimized to interface with external wiring;
an A/D conversion section for digitally encoding the analog processed detection signal;
a digital processing section for converting the digitized signal into a desired serial signal; and
an analog signal output and a serial signal output which are selectable between two output forms inclusive of an analog processed detection signal and a digital processed detection signal.

2. The pressure sensor according to claim 1, wherein said A/D conversion section and said digital processing section are incorporated in a first IC, whereas said interface section is incorporated in a second IC different from said first IC.

3. The pressure sensor according to claim 2, wherein said first IC comprises a section for storing said bit data, an A/D conversion section for digitally encoding said analog processed detection signal, and a digital processing section for converting said digitized signal into a desired serial signal, and said second IC comprises a section for performing analog processing of said detection signal from said element portion, a section for performing characteristic adjustment and compensation based on said bit data, and a serial interface section suitable for generating a serial output to said external wiring.

4. The pressure sensor according to claim 2, wherein said first IC comprises a section for storing said bit data, an A/D conversion section for digitally encoding said analog processed detection signal, a digital processing section for converting said digitized signal into a desired serial signal, a section for analog processing said detection signal from said element portion, and a section for performing characteristic adjustment and compensation based on said bit data, and said second IC comprises a serial interface section suitable for generating a serial output to said external wiring.

5. The pressure sensor according to claim 2, wherein said first IC comprises a section for performing analog processing of said detection signal from said element portion, a section for storing said bit data and performing characteristic adjustment and compensation based on said bit data, an A/D conversion section for digitally encoding said analog processed detection signal, and a digital processing section for converting said digitized signal into a desired serial signal, and said second IC comprises an interface section optimized to interface with said external wiring, and said first and second ICs are each provided with two output ports for said analog processed detection signal and said digital processed detection signal.

6. The pressure sensor according to claim 2, wherein said first IC comprises a section for performing analog processing of said detection signal from said element portion, a section for storing said bit data and performing characteristic adjustment and compensation based on said bit data, an A/D conversion section for digitally encoding said analog processed detection signal, and a digital processing section for converting said digitized signal into a desired serial signal, and said second IC comprises an interface section optimized to interface with said external wiring, and said first IC is provided with two output ports for said analog processed detection signal and said digital processed detection signal, and uses said output port for an analog signal, and said second IC is provided with said interface section for an analog signal suitable for an analog output.

7. The pressure sensor according to claim 6, further comprising a single conductor line connecting between said first and second ICs for communications of said analog processed detection signal or said digital processed detection signal therebetween.

8. The pressure sensor according to claim 2, wherein said first IC comprises a section for performing analog processing of said detection signal from said element portion, a section for storing said bit data and performing characteristic adjustment and compensation based on said bit data, an A/D conversion section for digitally encoding said analog processed detection signal, and a digital processing section for converting said digitized signal into a desired serial signal, and said second IC comprises an interface section optimized to interface with said external wiring, and said first IC is provided with an analog signal output port and a serial signal output port for said analog processed detection signal and said digital processed detection signal, respectively, and uses said serial signal output port, and said second IC is provided with said interface section for a serial signal suitable for a serial output.

9. The pressure sensor according to claim 8, further comprising a single conductor line connecting between said first and second ICs for communications of said analog processed detection signal or said digital processed detection signal therebetween.

10. The pressure sensor according to claim 2, wherein said second IC provided with said interface section comprises a power supply input port for receiving electric power from an external power supply, a power supply circuit for generating a voltage which has a ratio metric relation with respect to an input voltage supplied to said power supply input port and which has dropped from said input voltage from said external power supply, and a power supply output port for supplying said dropped power supply circuit output to the first IC, and said respective sections other than said power supply circuit and said interface section are configured to be operated by said dropped power supply circuit output.

11. A pressure sensor including an element portion for detecting pressure and a circuit portion having a signal processing function, both of which are integrally accommodated in the same package, said circuit portion comprising:
a first section for performing analog processing of a detection signal from said element portion;
a second section for storing bit data for characteristic adjustment and compensation and performing characteristic adjustment and compensation of the detection signal from said element portion based on said bit data;
an interface section optimized to interface with external wiring;
an A/D conversion section for digitally encoding the analog processed detection signal;
a digital processing section for converting the digitized signal into a desired serial signal; and
a power supply input port for receiving electric power from an external power supply, and a power supply circuit for generating a voltage which has a ratio metric relation with respect to an input voltage supplied to said power supply input port and which has dropped from said input voltage from said external power supply, and said respective sections other than said power supply circuit and said interface section are configured to be operated by said dropped power supply circuit output.

\* \* \* \* \*